(No Model.)  3 Sheets—Sheet 1.

N. E. DRAKE.
DOUGH TWISTING MACHINE.

No. 559,323. Patented Apr. 28, 1896.

WITNESSES:
L. I. Van Horn
Charles B. Mann Jr.

INVENTOR:
Newman E. Drake
By Chas. B. Mann

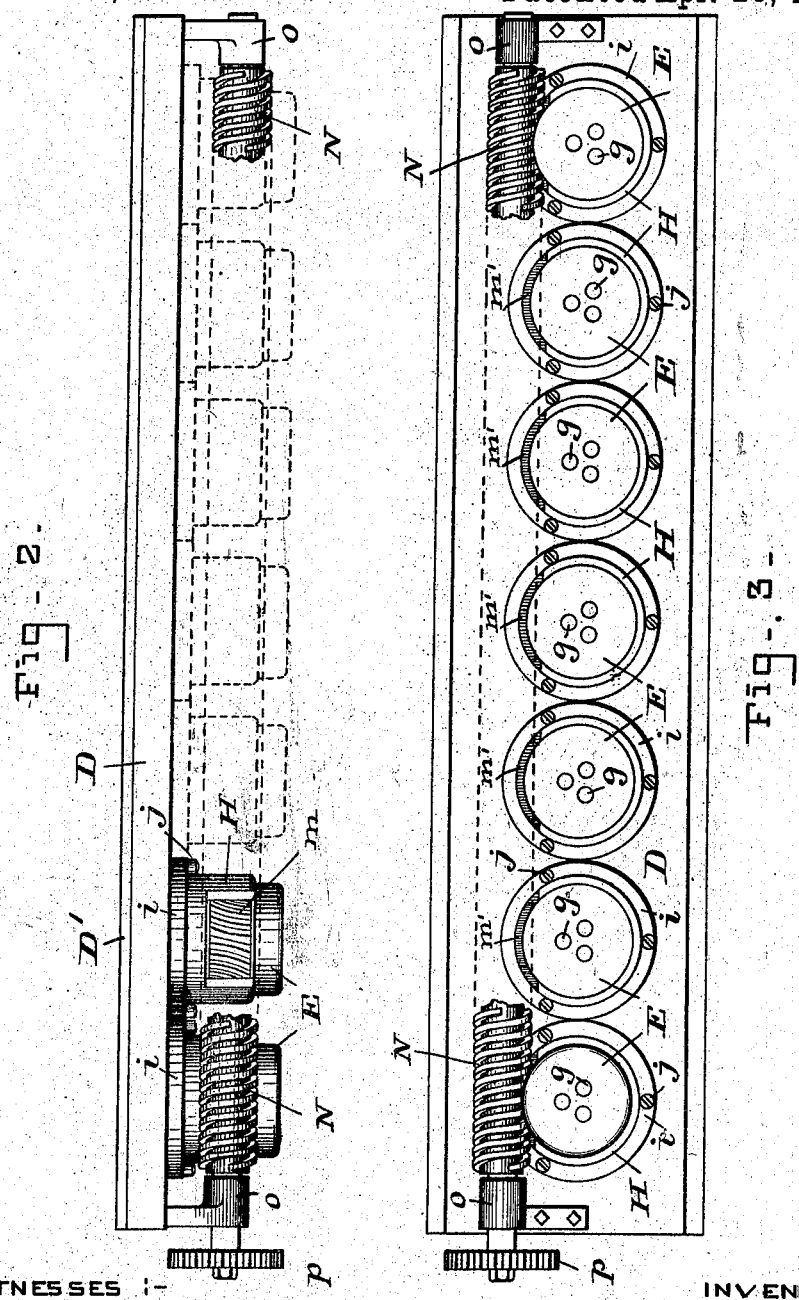

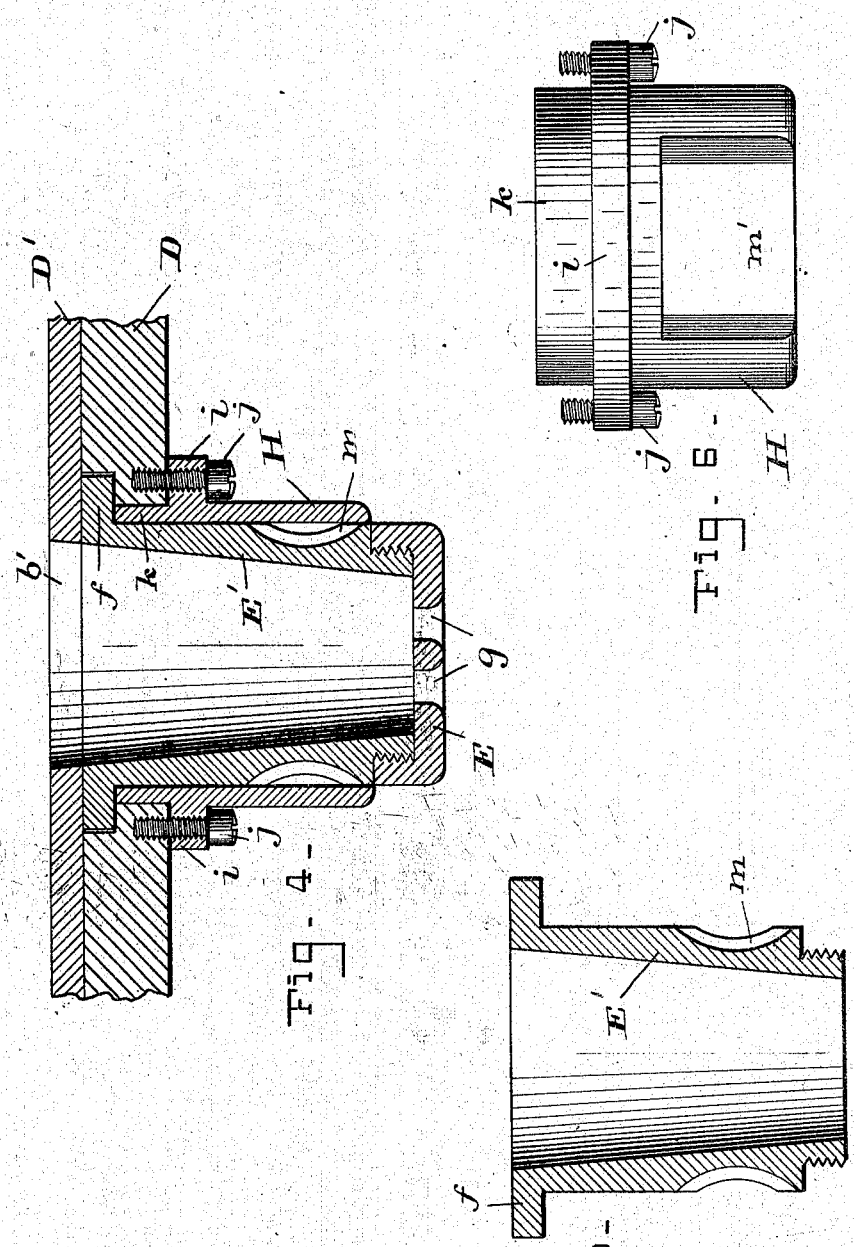

UNITED STATES PATENT OFFICE.

NEWMAN E. DRAKE, OF JERSEY CITY, NEW JERSEY, ASSIGNOR TO THE JAMES D. MASON COMPANY OF BALTIMORE CITY, OF MARYLAND.

DOUGH-TWISTING MACHINE.

SPECIFICATION forming part of Letters Patent No. 559,323, dated April 28, 1896.

Application filed January 8, 1895. Serial No. 534,187. (No model.)

*To all whom it may concern:*

Be it known that I, NEWMAN E. DRAKE, a citizen of the United States, residing at Jersey City, in the county of Hudson and State of New Jersey, have invented certain new and useful Improvements in Dough-Twisting Machines, of which the following is a specification.

This invention relates to a machine for producing twisted dough-strands for the manufacture of fancy cakes and crackers.

The object of the invention is to provide a machine which will simultaneously discharge a plural number of strands of dough and twist said plural number together, so as to form said strands into a multiple "twist" in the fashion of a rope. Any number of twisters may be used in the same machine. The multiple-twisted dough may be cut into short lengths and baked.

The invention is illustrated in the accompanying drawings, in which—

Figure 1:
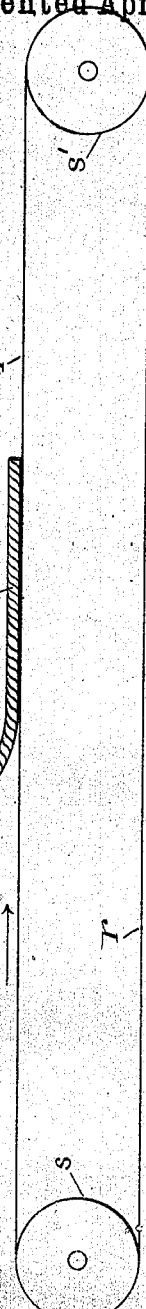
Figure 1:
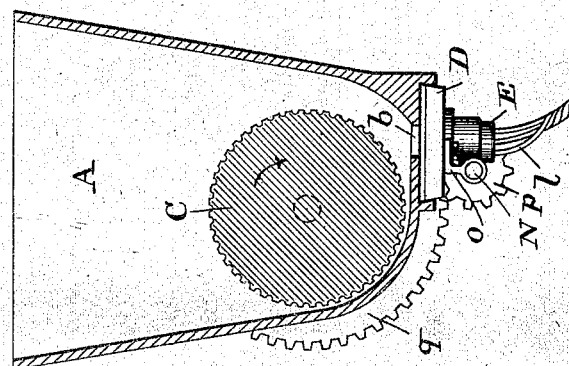

Figure 1 is a vertical section of the dough-hopper with my improvements attached and showing the dough-strands as they are twisted and discharged onto an endless carrier. Fig. 2 is an elevation showing the bottom plate of the hopper with my improvements attached, some of the nozzles or twisters being indicated by dotted lines. Fig. 3 is an inverted plan view of the bottom plate with my improvements, a portion of the worm-shaft being broken away. Fig. 4 is a sectional view, on a large scale, showing the dough-strand twister. Fig. 5 is a section view of the revoluble part of the twister. Fig. 6 is a side view of the stationary socket.

It may be stated that the dough is contained in a hopper or box A of any desired form and having in its bottom one or more outlets $b$. A roller C is mounted horizontally in this hopper or box and serves to feed or force the dough through the said outlet in the bottom. This roller may be driven by any suitable power.

A revoluble dough-discharging device of novel construction is combined with the outlet in the hopper. This device comprises the strand-twister referred to and will now be particularly described.

The supporting-plate D in the present instance is below the bottom of the hopper. One or more nozzles E are supported on the plate by a flange $f$ at the open end of the barrel part E', and the closed end has a plural number of separate discharge-outlets $g$, in the present instance three in number. The entire nozzle is revoluble independently of the hopper. The end E, having the outlets, may be integral with the barrel part E', or said end may, as seen in Fig. 4, comprise a cap E, having the outlets $g$ and screwed onto the end of the barrel E'. A stationary socket or collar H has a circumferential flange $i$, through which screws $j$ pass to hold it to the supporting-plate D, and an end $k$ of the collar projects or fits into a hole in the said plate, and the flange $f$ of the nozzle-barrel rests on the said end while the barrel fills the socket or collar, and the discharging end or cap E projects beyond the socket. A cover-plate D' rests on top of the supporting-plate D and covers the flanged ends $f$ of the nozzles. The cover-plate D' keeps the nozzles seated within the sockets H and the nozzles revolve in the sockets. This cover-plate has outlets $b'$, which coincide with the outlets $b$ in the hopper and also with the open ends of the nozzle-barrels. Thus the soft dough will pass from the hopper through the outlets $b$ $b'$ into the twisters of nozzle-barrels E', and then will discharge through the three separate outlets $g$, thereby forming three individual dough-strands $l$, (see Fig. 1,) which are then twisted together loosely, as at $l'$, by the revolution of the nozzle E.

As this machine is designed for making cakes and crackers in large quantities, it is important to provide in a single machine a number of dough-twister nozzles and to mount the dough-discharging device above all the nozzles, so that a uniform quantity of dough will be supplied alike and simultaneously to them all. The means for producing this result will now be described.

Each nozzle-barrel E' has an exterior worm-gear or teeth $m$, and each socket H has a side opening $m'$, which exposes said gear-teeth. The several revoluble nozzles or twisters are side by side in a straight line. A worm-shaft N is mounted in bearings $o$, so as to revolve, and is parallel with the shaft of the feed-roller C in the hopper, and said worm-shaft extends along the line of nozzles or twisters. (See Figs. 2 and 3, where the shaft is broken away and the broken part is indicated by broken lines.) All the sockets H are placed with their side openings $m'$ facing the same way, so that the gear-teeth $m$ of all the revoluble nozzles will be exposed in a row at the same side, thereby enabling the worm-shaft N to mesh or engage with all of them.

The worm-shaft has a small gear-wheel $p$, which meshes with a larger gear-wheel $q$ on the shaft of the roller C, this gearing being such that the speed of revolution of all the dough-twisters E is properly adjusted with respect to the speed of rotation of the single feed-roller C.

The dough-hopper A is mounted on any suitable support, (not shown in the drawings,) and below the dough-hopper is an endless belt or carrier $r$, which is mounted on suitable rollers $s\ s'$. This carrier may be constructed in any of the well-known ways and may have a continuous motion or an intermittent motion.

In operation several individual dough-strands $l$ discharge from each revoluble nozzle and are received on the endless carrier, and the revolution of the said nozzle serves to twist the separate strands together, as at $l'$, the said twisted part $l'$ being carried away by the movement of the endless carrier $r$. These multiple twists are then cut by an attendant in any desired lengths and then baked.

Having thus described my invention, what I claim as new, and desire to secure by Letters Patent, is—

1. In a machine for producing twisted dough-strands for cakes and crackers, the combination of a dough-hopper provided in its bottom with a number of feed-openings, $b$; a supporting-plate, D, mounted below the bottom of the hopper and having holes coincident with said feed-openings; stationary sockets, H, each having a circumferential flange, $i$, which takes against the under side of the supporting-plate and provided with an upper end, $k$, which fits into one of said holes in the plate, and said socket also provided with a side opening, $m'$, below said flange; a revoluble nozzle within each of said sockets and provided with a circumferential flange, $f$, which rests on the said upper end of the socket and with exterior gear-teeth which are exposed at the said side opening of the socket, said nozzles each having a plural number of separate discharge-outlets, $g$; and means engaging the exposed gear of the nozzles to revolve them.

2. In a machine for producing twisted dough-strands, the combination of a stationary dough-hopper having in its bottom a number of dough-discharge openings, $b$; a supporting-plate, D, mounted below the bottom of said hopper; a number of revoluble nozzles, E, mounted vertically on said supporting-plate, one below each of said feed-openings, and each nozzle provided with a plural number of separate discharge-outlets, $g$; a feed-roller, C, in the dough-hopper extending above all of said feed-openings so as to feed a like quantity of dough simultaneously to all the revoluble nozzles; a worm-shaft, N, extending parallel with the shaft of the feed-roller and serving to revolve all of said vertical nozzles; and a gear-wheel, $p$, on the worm-shaft meshing with a gear-wheel, $q$, on the shaft of the feed-roller, whereby the speed of revolution of all the revoluble nozzles is properly adjusted with respect to the speed of rotation of the said feed-roller, substantially as described.

In testimony whereof I affix my signature in the presence of two witnesses.

NEWMAN E. DRAKE.

Witnesses:
 THOS. F. GAFFNEY,
 WM. J. KEARNEY.